(12) United States Patent
Girondi

(10) Patent No.: US 7,682,508 B2
(45) Date of Patent: Mar. 23, 2010

(54) BASE FOR INTERNAL COMBUSTION ENGINE FILTER CARTRIDGE

(75) Inventor: Giorgio Girondi, Mantova (IT)

(73) Assignee: UFI Filters S.p.A., Porto Mantovano (Mantova) (IT)

( * ) Notice: Subject to any disclaimer, the term of this patent is extended or adjusted under 35 U.S.C. 154(b) by 562 days.

(21) Appl. No.: 10/544,394

(22) PCT Filed: Mar. 19, 2004

(86) PCT No.: PCT/EP2004/003233

§ 371 (c)(1),
(2), (4) Date: Jan. 31, 2006

(87) PCT Pub. No.: WO2004/087290

PCT Pub. Date: Oct. 14, 2004

(65) Prior Publication Data

US 2006/0118475 A1    Jun. 8, 2006

(30) Foreign Application Priority Data

Mar. 31, 2003   (IT)   .......................... RE2003A0033

(51) Int. Cl.
  *B01D 35/153* (2006.01)
  *B01D 35/16* (2006.01)
(52) U.S. Cl. .................... 210/234; 210/235; 210/248
(58) Field of Classification Search ............... 210/234, 210/235, 248
See application file for complete search history.

(56) References Cited

U.S. PATENT DOCUMENTS

| | | | | |
|---|---|---|---|---|
| 2,418,777 A | | 4/1947 | Le Clair | |
| 2,995,253 A | * | 8/1961 | Belgarde et al. | 210/323.2 |
| 3,066,803 A | * | 12/1962 | Seils, Jr. | 210/167.02 |
| 3,300,049 A | | 1/1967 | Hardcastle | |
| 3,912,631 A | | 10/1975 | Turnman | |
| 5,098,559 A | * | 3/1992 | Mack et al. | 210/130 |
| 5,139,658 A | * | 8/1992 | Hodge | 210/167.01 |
| 5,695,636 A | | 12/1997 | Gullett | |
| 6,488,845 B1 | * | 12/2002 | Neufeld et al. | 210/232 |
| 2003/0150787 A1 | * | 8/2003 | Morita | 210/234 |

FOREIGN PATENT DOCUMENTS

| | | | |
|---|---|---|---|
| DE | 3344568 A1 | * | 6/1985 |
| DE | 3432855 A1 | * | 3/1986 |
| DE | 3444267 A1 | * | 6/1986 |
| DE | 4331598 A1 | * | 3/1995 |
| DE | 29915840 U1 | * | 1/2001 |
| DE | 29920634 U1 | * | 4/2001 |
| WO | WO 02/070869 A1 | | 9/2002 |

* cited by examiner

Primary Examiner—Thomas M Lithgow
(74) Attorney, Agent, or Firm—Browdy and Neimark, PLLC

(57) ABSTRACT

Base for an internal combustion engine filter cartridge, intended to receive s a filter cartridge (3) provided with apertures for the entry of the oil to be filtered and for the exit of the filtered oil, in a respective upwardly facing matching engagement seat (2) provided with oil feed and discharge. channels to be connected to the matching channels of said cartridge, with said seat—there being peripherally associated a salient enveloping element (33) with which it forms an oil spill protection compartment, from the bottom of which there extends a recovery conduit (6) connected to a collection site and intercepted by a check valve (66), the closed or open state of which depends on whether the cartridge and seat are mutually engaged or disengaged respectively.

6 Claims, 3 Drawing Sheets

BASE FOR INTERNAL COMBUSTION ENGINE FILTER CARTRIDGE

TECHNICAL FIELD

This invention relates to lubricating oil filtration in internal combustion engines in general.

BACKGROUND ART

Internal combustion engines are known to generally comprise a lubrication system with which a disposable filter cartridge is associated contained in a cup, which it is not necessary to describe in detail.

Said cartridge is intended to be removably coupled, generally by a threaded system and by way of suitable interposed seal means, to a base provided on the engine structure and comprising a suitable seat.

The base of said cartridge is provided with apertures for the entry of the oil to be filtered and for the exit of the filtered oil, said seat presenting corresponding arrival and departure channels for the oil to be filtered and for the filtered oil respectively.

Engines exist in which the cartridge carrying seat generally faces downwards, and others in which it generally faces upwards.

Sunken regions which fill with oil during engine operation are generally present at the mutually facing surfaces of said seat and said cartridge.

When the cartridge is to be removed, for example for its replacement, at least a part of the oil present in said regions is no longer retained, hence is free to pour out of the base.

If the cartridge carrying seat generally faces downwards, the loss of said oil fraction is generally not a problem because the oil is retained by the cup of the cartridge.

However if the cartridge carrying seat faces generally upwards, the loss of said oil fraction can be a problem for at least one of the following reasons: soiling of engine parts and accessories reaching high temperature, oil seepage into electrical and/or electronic equipment, dirtying of the engine compartment and panels, and contamination of the workplace floor.

OBJECT AND SUMMARY OF THE INVENTION

The main object of the present invention is to provide a base for a filter cartridge able to overcome the aforesaid problem.

A further object of the invention is to attain said object within the context of a simple, rational, reliable and economical construction.

Said objects are attained by a base presenting the characteristic elements indicated in the claims.

In a totally general sense it comprises an upwardly facing engagement seat for receiving a filter cartridge contained in a cup-shaped sealed casing and provided with apertures for the entry of the oil to be filtered and for the exit of the filtered oil. According to the invention, there is peripherally associated with said seat a salient enveloping element with which it forms a sort of bowl, from the base of which there branches a recovery conduit extending to a suitable collection site, such as the engine oil sump, and intercepted by a check valve, described in detail hereinafter, the closed or open state of which depends on whether the cartridge and base are mutually engaged or disengaged respectively.

All the objects of the invention are attained by virtue of the aforesaid means.

In this respect, when in its closed state, i.e. with the cartridge mounted, said valve enables the oil to undergo normal filtration, whereas when in its closed state, i.e. with the cartridge removed and with the aid of said enveloping element, it allows automatic recovery of the oil which would otherwise spill out of the base.

Preferably the valve is closed and opened automatically, for example by elastic thrust means interposed between the valve and the base, and loaded by the action of the cartridge during its mounting.

BRIEF DESCRIPTION OF THE DRAWINGS

The characteristics and the constructional merits of the invention will be apparent from the ensuing detailed description given with reference to the figures of the accompanying drawings, which illustrate a preferred embodiment thereof given by way of non-limiting example.

DETAILED DESCRIPTION OF THE PREFERRED EMBODIMENT(S) OF THE INVENTION

Figure 1:
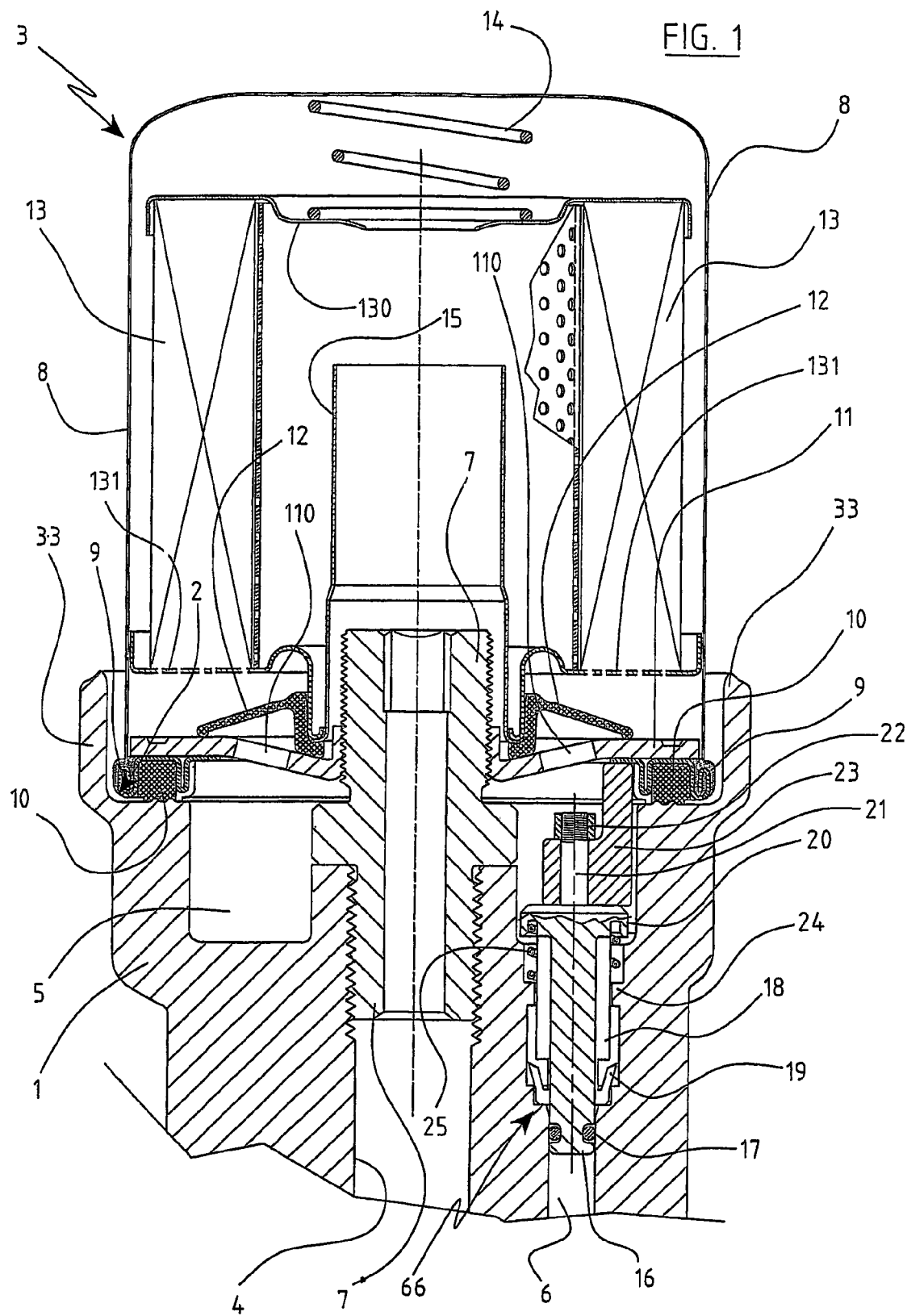
FIG. 1 is an axial section through the invention with the cartridge shown mounted.
Figure 3:
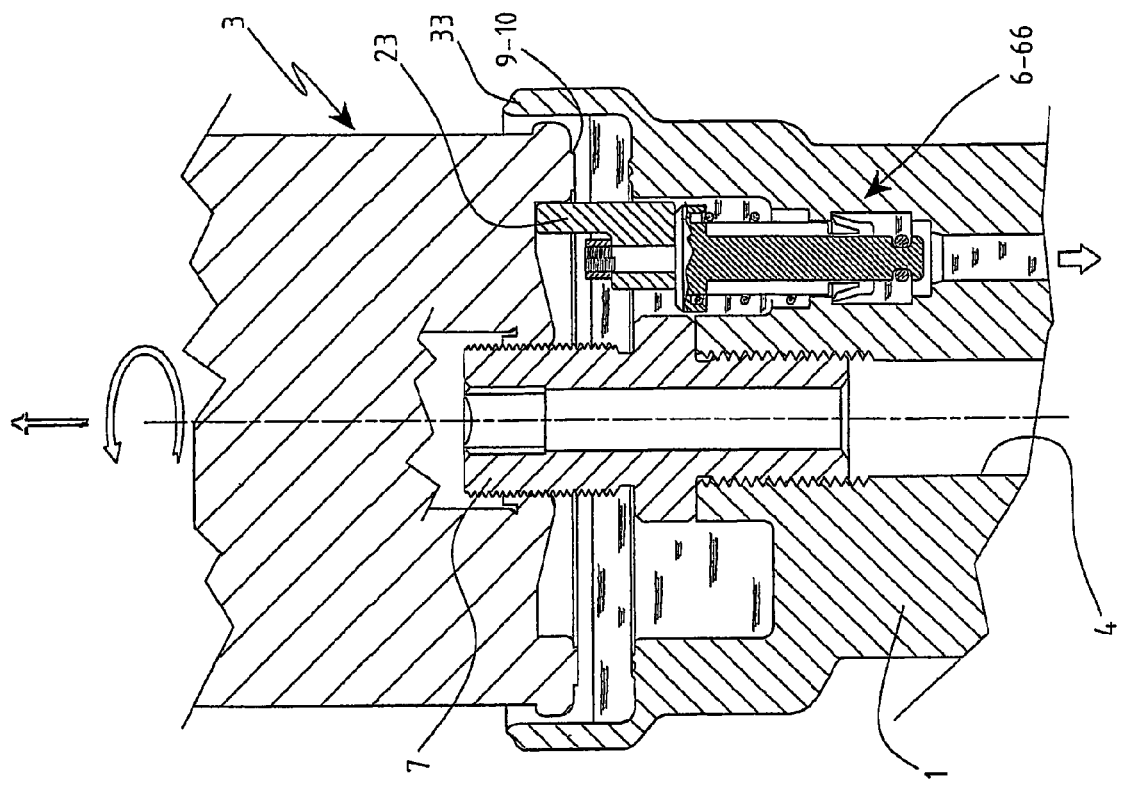
FIG. 3 is a partial schematic view showing the cartridge during an intermediate stage of its unscrewing from its seat.
Figure 2:
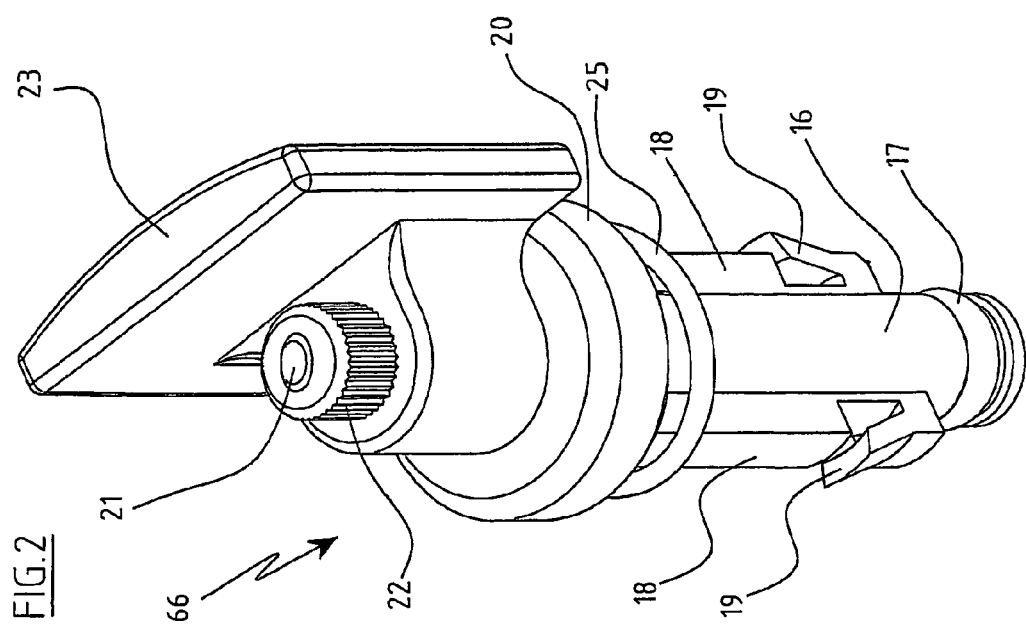
FIG. 2 is a perspective view of the check valve of the invention.
Figure 4:
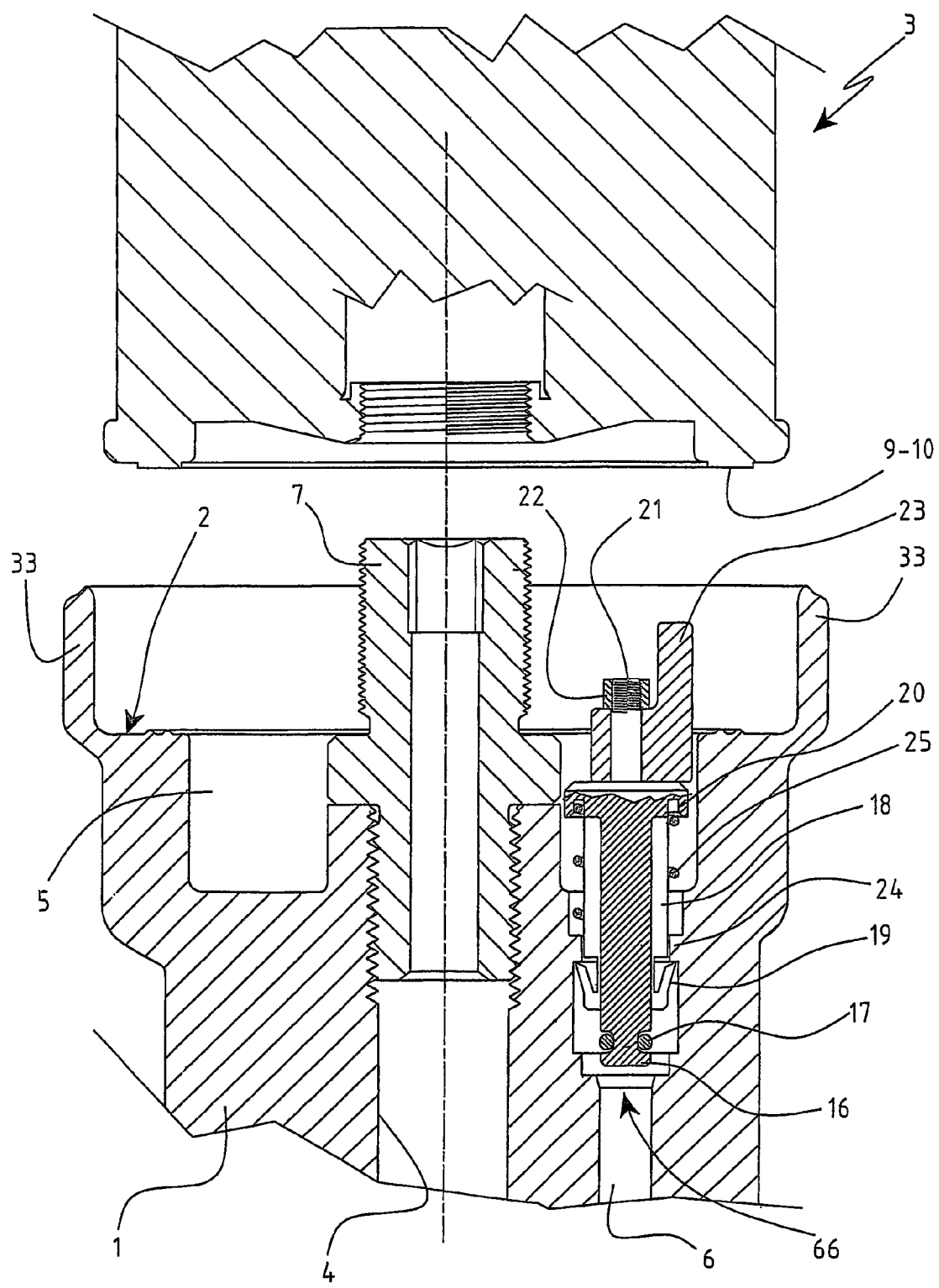
FIG. 4 is a view similar to the preceding showing the cartridge removed.

The figures, and in particular FIGS. 1, 3 and 4, show the base 1 on which a seat 2 is provided for mounting a lubricating oil filtration cartridge, of the disposable type.

In the illustrated example said seat 2 lies horizontally and is open upwards, but could equally be slightly inclined.

The seat 2 is provided with a central conduit 4 for exit of the filtered oil, and with a concentric annular groove 5 for feeding the oil to be filtered to the cartridge 3.

A usual arrival conduit for the oil to be fed, not shown for simplicity, and a recovery conduit 6 of different cross-sections, described hereinafter, open into said groove 5.

As can be seen, into said central conduit 4 there is screwed a hollow stem 7 which extends beyond the seat 2 with a threaded portion provided for fixing the overlying cartridge 3.

Said cartridge 3, of known type, comprises a cup-shaped outer casing 8, to the mouth of which there is seam-joined an annular ring 9 carrying an underlying gasket 10 for sealing along the outer annular edge of the seat 23 (FIG. 1).

Proceeding in the figure from the bottom upwards, said cup 8 internally contains a centrally holed disc 11, a lip-shaped annular retention gasket 12, a hollow cylindrical filtering body 13, and a thrust spring 14 positioned between the base of the cup 8 and the upper cover 130 of the filtering body 13, to elastically clamp the assembly together.

A central anti-emptying tube 15 is also provided, coupled to the perforated lower cover of the filtering body 13.

The central hole of said disc 11 has a thread to be screwed onto the hollow stem 7, about said hole said disc 11 presenting a circumferential series of holes 110 facing the lip gasket 121, which acts as a valve. Said gasket 12 closes and opens automatically when the engine is stopped and started respectively.

In this respect, during engine operation the oil to be filtered, which is under pressure, enters the chamber defined by the groove 5, passes through the holes 110 and into the cartridge by raising the gasket, then passes through the filtering body 13 and finally reaches the exit conduit 4 via the tube 15 and the stem 4.

According to the invention, the base 1 comprises an enveloping element 33, said recovery conduit 6 being intercepted by a check valve, or valving element, indicated by 66.

Said enclosing element 33 consists of a relatively thin enclosing wall projecting upwards from the base and having its inner surface suitably spaced from the outer surface of the bottom end of the cartridge 3.

In the illustrated example said wall is integral with the base 1, but could also be constructed separately of metal or other suitable material, and then suitably secured to the base 1.

The valving element 66 comprises a cylindrical rod 16 presenting at its bottom an annular gasket 17, in an intermediate position two diametrically opposing longitudinal ribs 18 provided lowerly with an elastically deformable anti-withdrawal tooth 19, and at its top a widened head 20 beyond which there is a coaxial threaded pin 21.

The widened head 20 and the pin 21 are received in the groove 5.

The holed arm of a right-angled appendix 23 is engaged with said pin 21 and fixed thereto by the nut 22, the other arm passing beyond the seat 2 to rest against the ring 9 of the cartridge 3 with a sliding engagement.

Said other arm is shaped to maintain the valve 66 closed when the cartridge 3 is mounted, and to prevent the valve from rotating when the cartridge 3 is screwed in or out.

With reference to the recovery conduit 6, this connects the groove 5 to a convenient collection point, for example the engine oil sump. It comprises (see FIGS. 1, 3 and 4) a lower smaller diameter portion with which it sealedly engages the gasket 17, and an upper larger diameter portion presenting an intermediate circumferential ledge 24.

This latter acts as an abutment for the underlying teeth 19, and as a support for an overlying thrust spring 25 mounted about the upper part of the rod 16, below the head 20.

When the cartridge 3 is removed, for example to be replaced, the region between the groove 5 of the base 1 and the lip gasket 12 is filled with unfiltered oil.

As the unscrewing of the cartridge 3 proceeds, it rises from the seat 2 and is followed by the valving element 66 by the effect of the thrust of the spring 25.

When there is no longer a seal between the cartridge 3 and seat 2, the oil contained between this latter and the lip gasket 12 seeps to the outside of the cartridge 3 and is distributed uniformly on the flat surface bounded by the wall 33 (see FIG. 3).

When the cartridge 3 has been completely unscrewed it can be removed (see FIG. 4), the oil lying above the seat 2, within the groove 5, and in the top of the recovery conduit 6 then discharging into the engine oil sump.

The invention claimed is:

1. An oil filter unit, comprising:
    a base configured to receive an internal combustion engine filter cartridge, said filter cartridge contained completely in a cup-shaped sealed casing and provided with apertures for the entry of the oil to be filtered and for the exit of the filtered oil, in a respective upwardly facing matching engagement seat provided with oil feed and discharge channels to be connected to the matching channels of said cartridge,
    a salient enveloping element peripherally associated with said engagement seat, said salient enveloping element and said engagement seat forming an oil spill protection compartment,
    a further conduit for recovery extending from the bottom of said oil spill protection compartment, said further conduit being connected to a collection site,
    a drain valve disposed in said further conduit for recovery, a closed or open state of the drain valve depending on a mutually engaged or disengaged condition of the filter cartridge and the engagement seat, respectively, said cup-shaped casing containing the filter cartridge, being connectable to said base by a hollow stem portion of said base,
    whereby said salient enveloping element envelops a portion of said cup-shaped casing when said cup-shaped casing is mounted on said base.

2. The oil filter of claim 1, wherein said enveloping element is constructed in one piece with said base.

3. The oil filter of claim 1, wherein said enveloping element consists of a separately formed piece sealedly fixed to the base.

4. The oil filter of claim 1, wherein said drain valve comprises a valving element presenting at one end a seal element inserted into said recovery conduit, where a respective valve seat is located, and at its other end an appendix which extends beyond the cartridge carrying seat to rest against the bottom of the cartridge with sliding engagement.

5. The oil filter of claim 4, wherein said valving element is provided with elastic means to maintain it constantly forced towards its open position.

6. The oil filter of claim 4, further comprising anti-withdrawal means interposed between the valving element and its seat.

* * * * *